United States Patent
Hyde et al.

(10) Patent No.: US 9,314,929 B2
(45) Date of Patent: Apr. 19, 2016

(54) SYSTEMS, DEVICES, AND METHODS INCLUDING A WHEELCHAIR-ASSIST ROBOT

(71) Applicant: Elwha LLC, Bellevue, WA (US)

(72) Inventors: Roderick A. Hyde, Redmond, WA (US); Jordin T. Kare, Seattle, WA (US); Eric C. Leuthardt, St. Louis, MO (US); Richard T. Lord, Gig Harbor, WA (US); Robert W. Lord, Seattle, WA (US); Dennis J. Rivet, Chesapeake, VA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/465,758

(22) Filed: Aug. 21, 2014

(65) Prior Publication Data

US 2016/0052139 A1  Feb. 25, 2016

(51) Int. Cl.
| | |
|---|---|
| *G06F 19/00* | (2011.01) |
| *B25J 11/00* | (2006.01) |
| *G05D 1/00* | (2006.01) |
| *G05D 1/02* | (2006.01) |
| *B25J 9/16* | (2006.01) |

(52) U.S. Cl.
CPC ............ *B25J 11/009* (2013.01); *B25J 9/1697* (2013.01); *G05D 1/0094* (2013.01); *G05D 1/0276* (2013.01); *G05D 2201/0206* (2013.01)

(58) Field of Classification Search
CPC ............ G06F 3/015; A61F 2002/704; A61F 2002/7615; A61F 2/50; A61F 2/68
USPC .................. 700/245, 258; 600/544, 545, 595; 601/5; 607/48
See application file for complete search history.

(56) References Cited

U.S. PATENT DOCUMENTS

| | | | |
|---|---|---|---|
| 6,374,155 B1 | 4/2002 | Wallach et al. | |
| 6,484,829 B1 | 11/2002 | Cox | |
| 6,842,692 B2 | 1/2005 | Fehr et al. | |
| 6,917,854 B2 | 7/2005 | Bayer | |
| 7,161,322 B2 | 1/2007 | Wang et al. | |
| 7,228,203 B2 | 6/2007 | Koselka et al. | |
| 8,359,122 B2 | 1/2013 | Koselka et al. | |
| 8,430,192 B2 | 4/2013 | Gillett | |
| 8,977,431 B2 * | 3/2015 | Peters et al. | 701/36 |
| 2004/0005959 A1 * | 1/2004 | Takizawa | 482/51 |
| 2005/0104547 A1 | 5/2005 | Wang et al. | |

(Continued)

OTHER PUBLICATIONS

Gräser, Technological Solutions to Autonomous Robot Control, 1998, Internet. p. 1-7.*
Shibata et al., Development and Integration of Generic Components for a Teachable Vision-Based Mobile Robot, 1996, IEEE, p. 230-236.*
Marthens et al., A Friend for Assisting Handicapped People, 2001, IEEE, p. 57-65.*

(Continued)

*Primary Examiner* — McDieunel Marc
(74) *Attorney, Agent, or Firm* — Daniel J. Honz; Advent, LLP

(57) ABSTRACT

Systems, devices, and methods are described for providing, among other things, a wheelchair-assist robot for assisting a wheelchair user with everyday tasks or activities at work, at home, and other locations. In an embodiment, the mobile wheelchair-assist robot includes a wheelchair interface component configured to exchange control information with a wheelchair controller. In an embodiment, a wheelchair-assist robot mount assembly is provided for, among other things, electrically and physically coupling a wheelchair-assist robot to an associated wheelchair.

24 Claims, 6 Drawing Sheets

(56) References Cited

U.S. PATENT DOCUMENTS

| | | | |
|---|---|---|---|
| 2005/0216126 A1 | 9/2005 | Koselka et al. | |
| 2005/0219114 A1 | 10/2005 | Kawabe et al. | |
| 2005/0279551 A1* | 12/2005 | LoPresti | 180/167 |
| 2006/0167371 A1* | 7/2006 | Flaherty et al. | 600/545 |
| 2006/0167564 A1* | 7/2006 | Flaherty et al. | 623/57 |
| 2006/0173259 A1* | 8/2006 | Flaherty et al. | 600/331 |
| 2006/0189900 A1* | 8/2006 | Flaherty | 600/595 |
| 2006/0224253 A1 | 10/2006 | Kanaoka et al. | |
| 2006/0277074 A1* | 12/2006 | Einav et al. | 705/3 |
| 2007/0080000 A1* | 4/2007 | Tobey et al. | 180/21 |
| 2007/0198129 A1 | 8/2007 | Koselka et al. | |
| 2010/0243344 A1 | 9/2010 | Wyrobek et al. | |
| 2011/0139923 A1 | 6/2011 | Papanikolopoulos et al. | |
| 2012/0001058 A1 | 1/2012 | Luke et al. | |
| 2012/0024091 A1 | 2/2012 | Kawabuchi et al. | |
| 2013/0204465 A1 | 8/2013 | Phillips et al. | |
| 2014/0025202 A1 | 1/2014 | Umeno et al. | |
| 2014/0032596 A1 | 1/2014 | Fish et al. | |
| 2014/0060223 A1 | 3/2014 | Tanaka | |
| 2014/0254896 A1 | 9/2014 | Zhou et al. | |

OTHER PUBLICATIONS

Cunningham et al.; "Jamster: A Mobile Dual-Arm Assistive Robot with Jamboxx Control"; IEEE International Conference on Automation Science and Engineering (CASE); Aug. 18-22, 2014; pp. 509-514; IEEE.

Gonzalez et al.; "A Description of the SENA Robotic Wheelchair"; IEEE MELECON; May 16-19, 2006; pp. 437-440; IEEE.

Jiang et al.; "Integrated Vision-Based Robotic Arm Interface for Operators with Upper Limb Mobility Impairments"; IEEE International Conference on Rehabilitation Robotics; Jun. 24-26, 2013; pp. 1-6; IEEE.

Mashali et al.; "Design, Implementation and Evaluation of a Motion Control Scheme for Mobile Platforms with High Uncertainties"; IEEE RAS & EMBS International Conference of Biomedical Robotics (BioRob); Aug. 12-15, 2014; pp. 1091-1097; IEEE.

Prassler et al.; "Maid: A Robotic Wheelchair Operating in Public Environments"; LNAI; 1999; pp. 68-95; Springer-Verlag.

Prassler et al. "A Robotic Wheelchair for Crowded Public Environments" IEEE Robotics and Automation Magazine; Mar. 2001; pp. 38-45; IEEE.

* cited by examiner

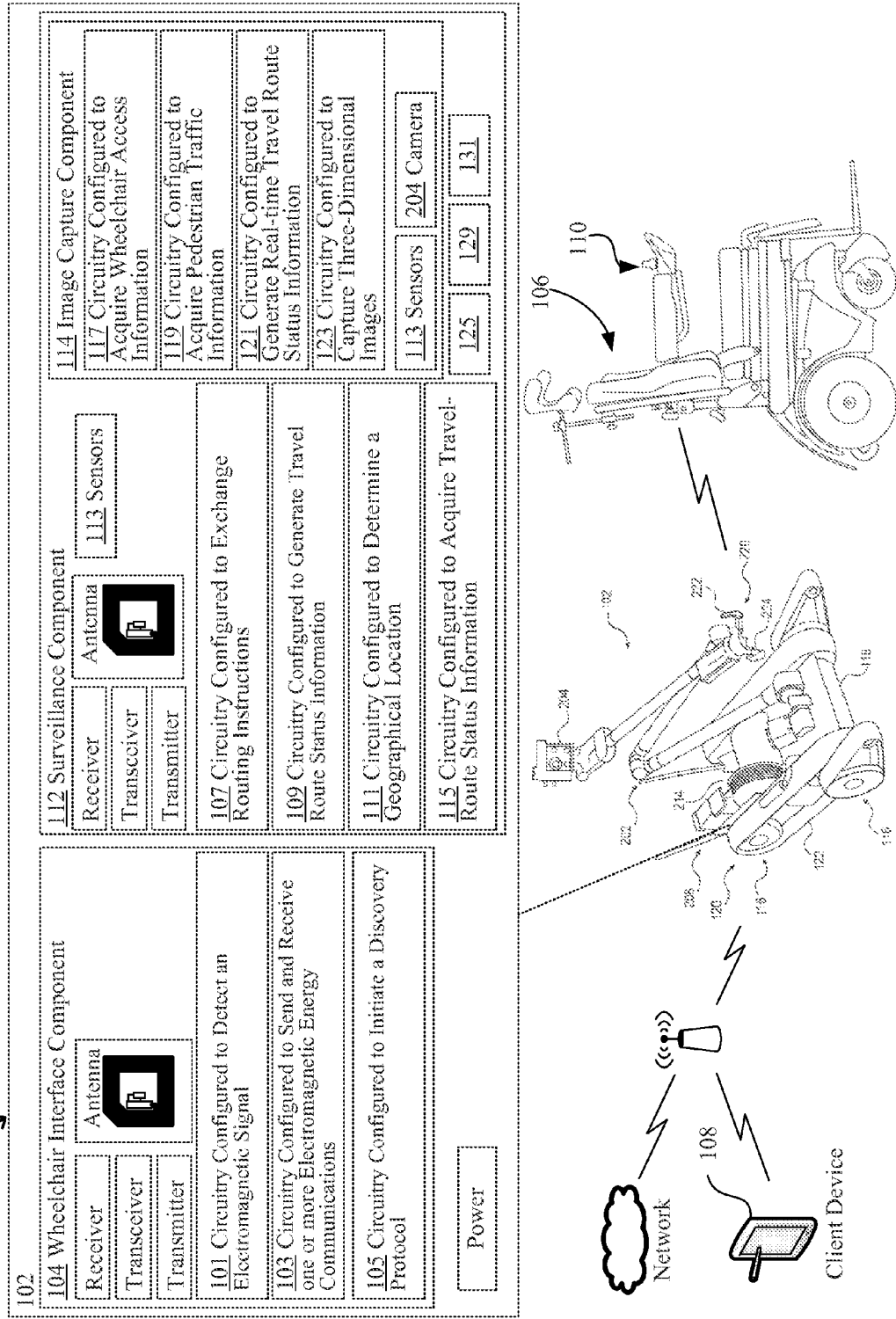

FIG. 2

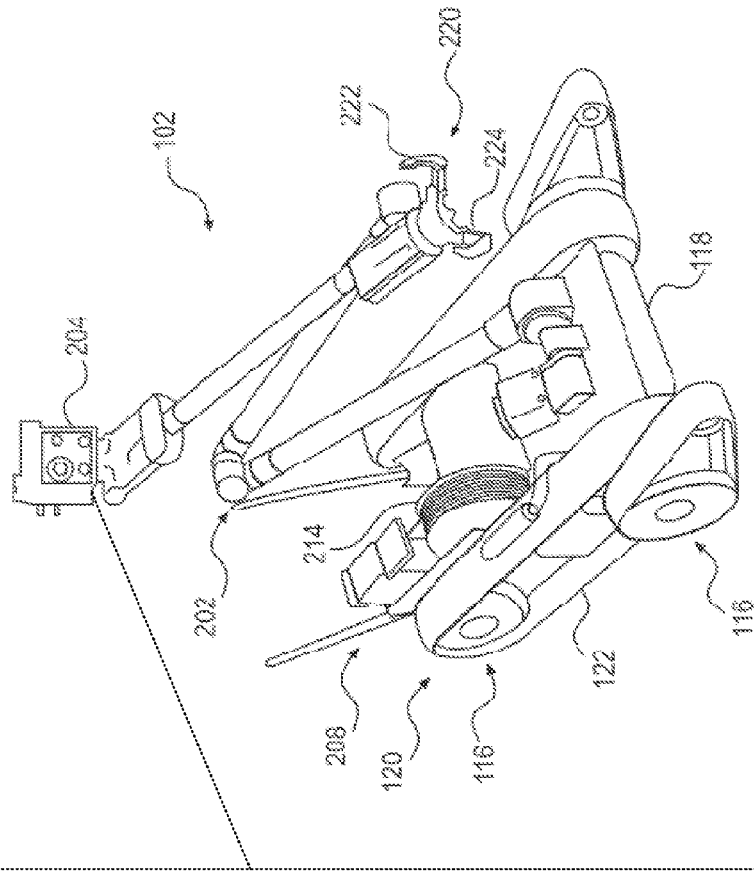

- 124 Automated Imaged-Based Obstacle Avoidance Component
- 126 Circuitry Configured to Communicate one or more Navigation Control Commands
- 112 Surveillance Component
- 127 Circuitry Configured to Provide one or more of Travel Route Image Information, Wheelchair Geographic Location Information, or Wheelchair Travel Direction Information
- 129 Circuitry Configured to Generate one or more Navigation Control Commands
- 131 Circuitry Configured to Communicate one or more Navigation Control Commands
- 133 Autonomous Imaged-Guided Engage Component
- 135 Autonomous Navigation Component
- 114 Image Capture Component
- 206 Automated Imaged-based Obstacle Avoidance Component
- 113 Sensors
- Power FIG. 4A 100
- 412 Surveillance Payload
  - 113 Sensors
- 104 Wheelchair Interface Component
- 114 Image Capture Component
- 123 Circuitry Configured to Capture Three-Dimensional Images
- 129 Circuitry Configured to Generate one or more Navigation Control Commands
- 135 Autonomous Navigation Component
- 139 Circuitry Configured to Provide an Audio Signal
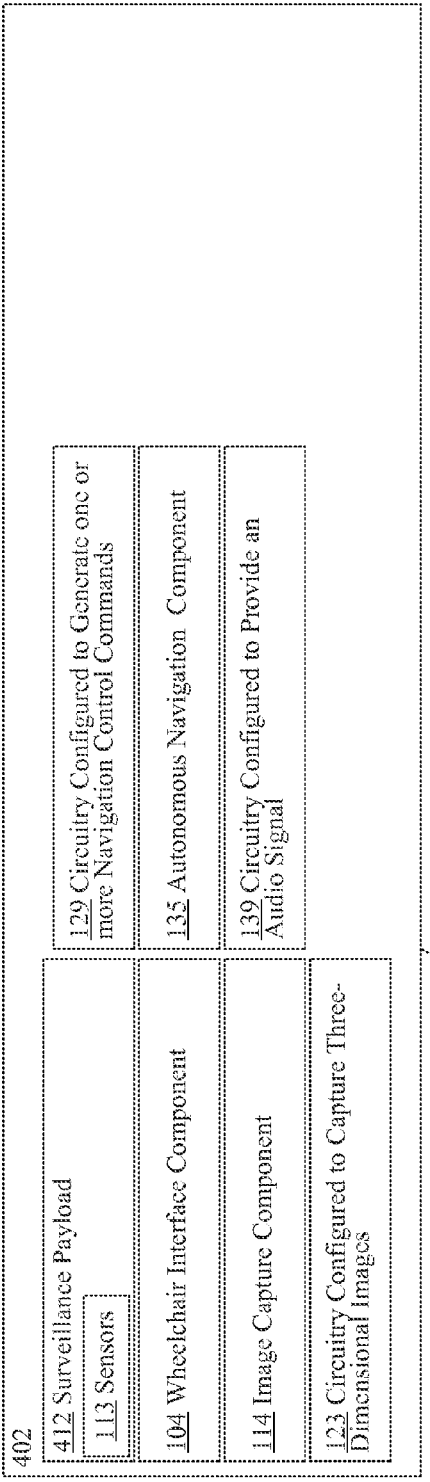
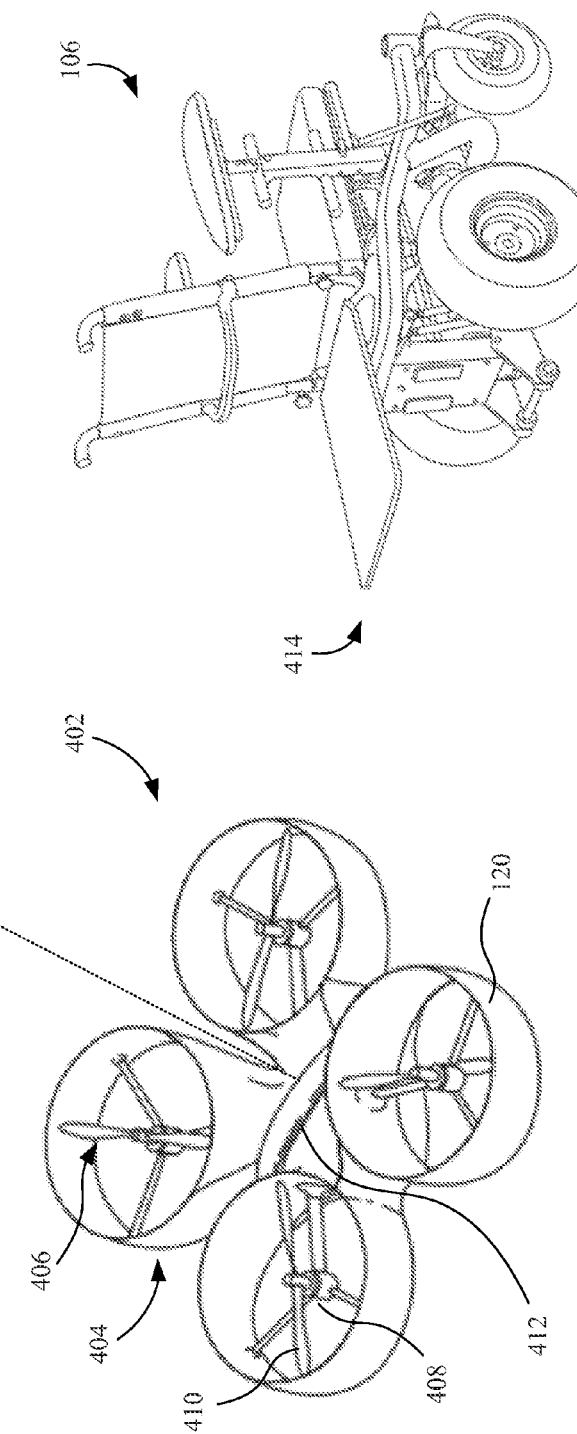

FIG. 4B
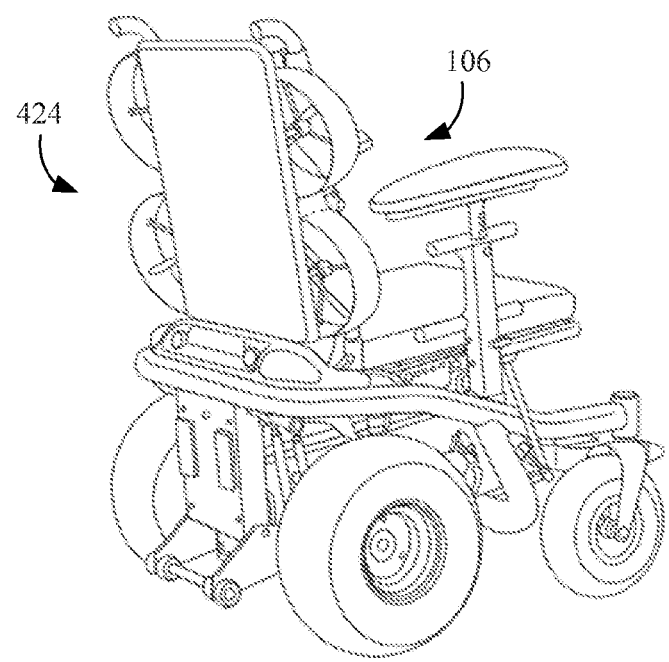
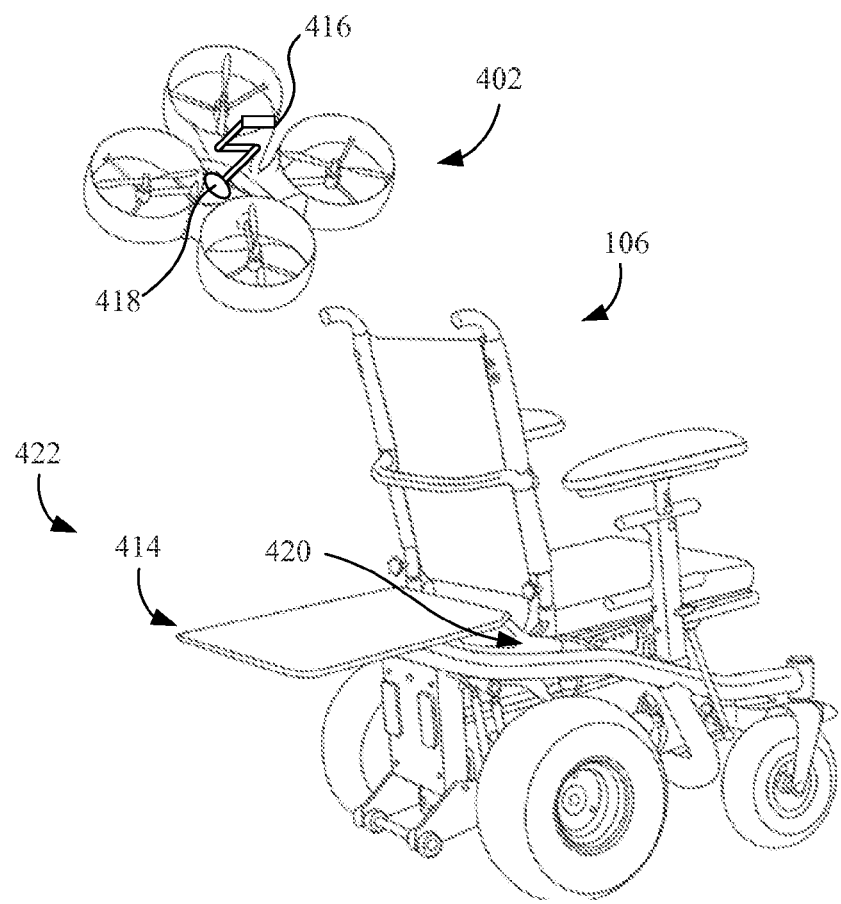

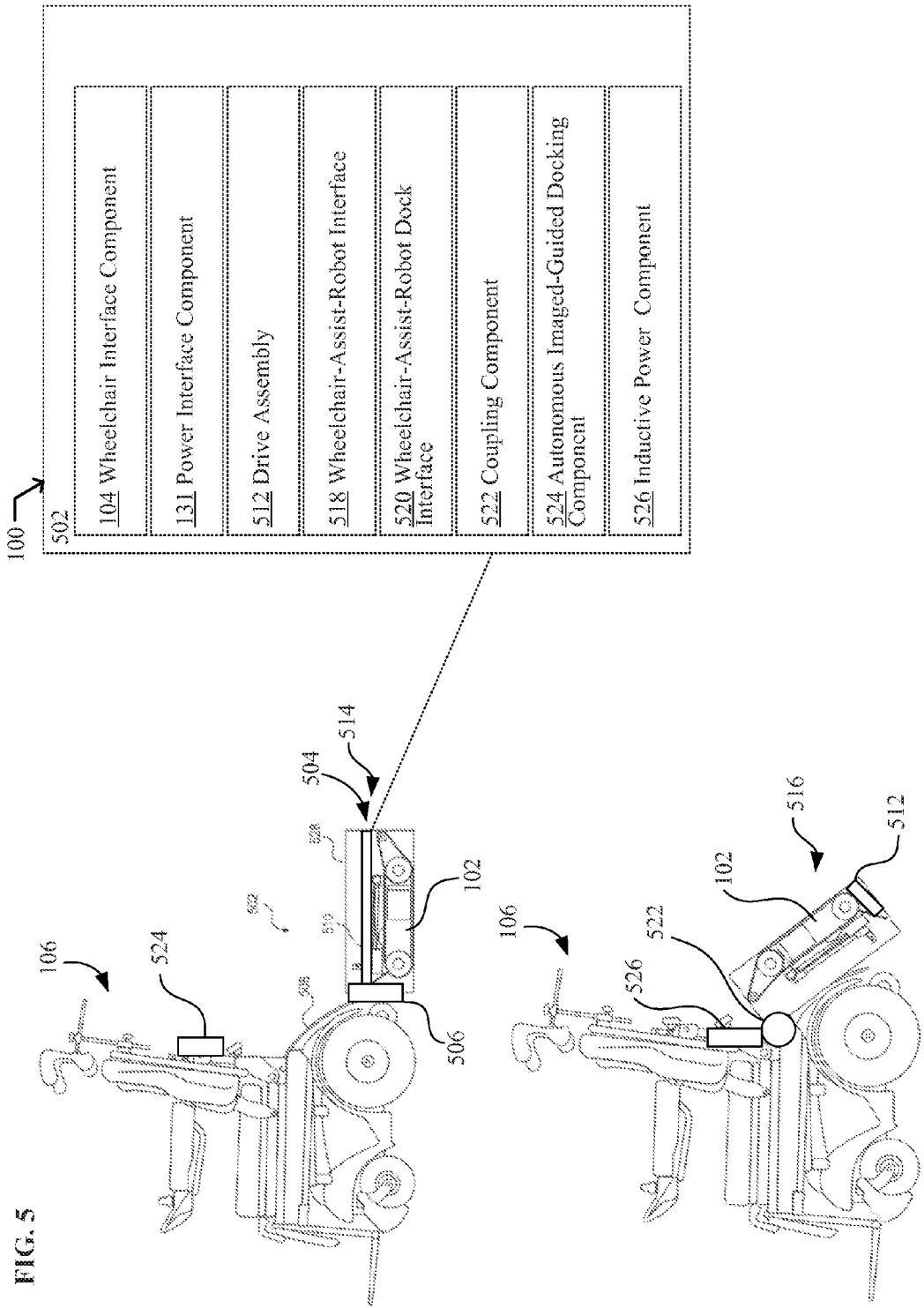

SYSTEMS, DEVICES, AND METHODS INCLUDING A WHEELCHAIR-ASSIST ROBOT

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

None

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In an aspect, the present disclosure is directed to, among other things, a mobile wheelchair-assist robot. In an embodiment, the mobile wheelchair-assist robot includes a wheelchair interface component configured to exchange control information with an associated wheelchair (a manual wheel chair, a powered wheelchair, an electric wheelchair, a self-propelled wheelchair, etc.). In an embodiment, the mobile wheelchair-assist robot includes a surveillance component configured to exchange information with the associated wheelchair.

In an aspect, the present disclosure is directed to, among other things, a mobile wheelchair-assist robot including a wheelchair interface component. In an embodiment, the mobile wheelchair-assist robot includes a powered winch assembly mounted on a frame. In an embodiment, the winch assembly is communicatively coupled to the wheelchair interface component. In an embodiment, the winch assembly is configured to deploy responsive to one or more inputs from the wheelchair interface component. In an embodiment, the powered winch assembly includes a pull member configured to connect to a wheelchair and to pull the wheelchair along a travel path responsive to one or more inputs from the wheelchair interface component.

In an aspect, the present disclosure is directed to, among other things, a wheelchair-assist robot including a wheelchair interface component operable to exchange information with a wheelchair client device. In an embodiment, the mobile wheelchair-assist robot includes an articulated arm assembly operably coupled to the wheelchair interface component. In an embodiment, the articulated arm assembly comprises a grasping mechanism configured to move a first grasping member relative to a second grasping member between at least a first position and a second position. In an embodiment, the grasping mechanism is configured to move the first grasping member relative to the second grasping member between an open position and a closed position. In an embodiment, the wheelchair interface component is configured to vary the position of the grasping mechanism based on one or more inputs from the wheelchair client device.

In an aspect, the present disclosure is directed to, among other things, a flying wheelchair-assist robot including a wheelchair interface component operable to exchange control information with a wheelchair client device. In an embodiment, the flying wheelchair-assist robot includes an electronic surveillance payload. In an embodiment, the flying wheelchair-assist robot includes a rotorcraft structure operably coupled to wheelchair interface component. In an embodiment, the rotorcraft structure includes one or more rotors for generating lift. In an embodiment, the rotorcraft structure includes multiple rotors driven by respective motors. In an embodiment, the rotorcraft structure includes a plurality of rotary wings. In an embodiment, the rotorcraft structure comprises a multirotor helicopter.

In an aspect, the present disclosure is directed to, among other things, a mobile wheelchair-assist robot system. In an embodiment, the mobile wheelchair-assist robot system includes a wheelchair-assist robot. In an embodiment, the mobile wheelchair-assist robot system includes a wheelchair-assist robot mount assembly constructed and arranged to be mounted onto a wheelchair. In an embodiment, the wheelchair-assist robot mount assembly comprises a portion that engages the mobile wheelchair-assist robot and causes the mobile wheelchair-assist robot to physically secure against a portion of the wheelchair. In an embodiment, the wheelchair-assist robot mount assembly includes a portion that engages the mobile wheelchair-assist robot and causes the mobile wheelchair-assist robot to physically secure against a portion of the wheelchair in response to movement of the wheelchair-assist robot mount assembly. In an embodiment, the wheelchair-assist robot mount assembly includes a powered device mechanism that engages the mobile wheelchair-assist robot and causes the mobile wheelchair-assist robot to physically secure against a portion of the wheelchair in response to one or more inputs from a client device associated with a wheelchair. In an embodiment, the wheelchair-assist robot mount assembly includes a wheelchair interface component that allows a wheelchair controller and the wheelchair-assist robot to exchange control commands.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 is a perspective view of a wheelchair-assist robot system according to one embodiment.

FIG. 2 is a perspective view of a wheelchair-assist robot system according to one embodiment.

FIGS. 4A and 4B show perspective views of a wheelchair-assist robot system according to one embodiment.

FIG. 5 is a perspective view of a wheelchair-assist robot system according to one embodiment.

DETAILED DESCRIPTION

Figure 3:
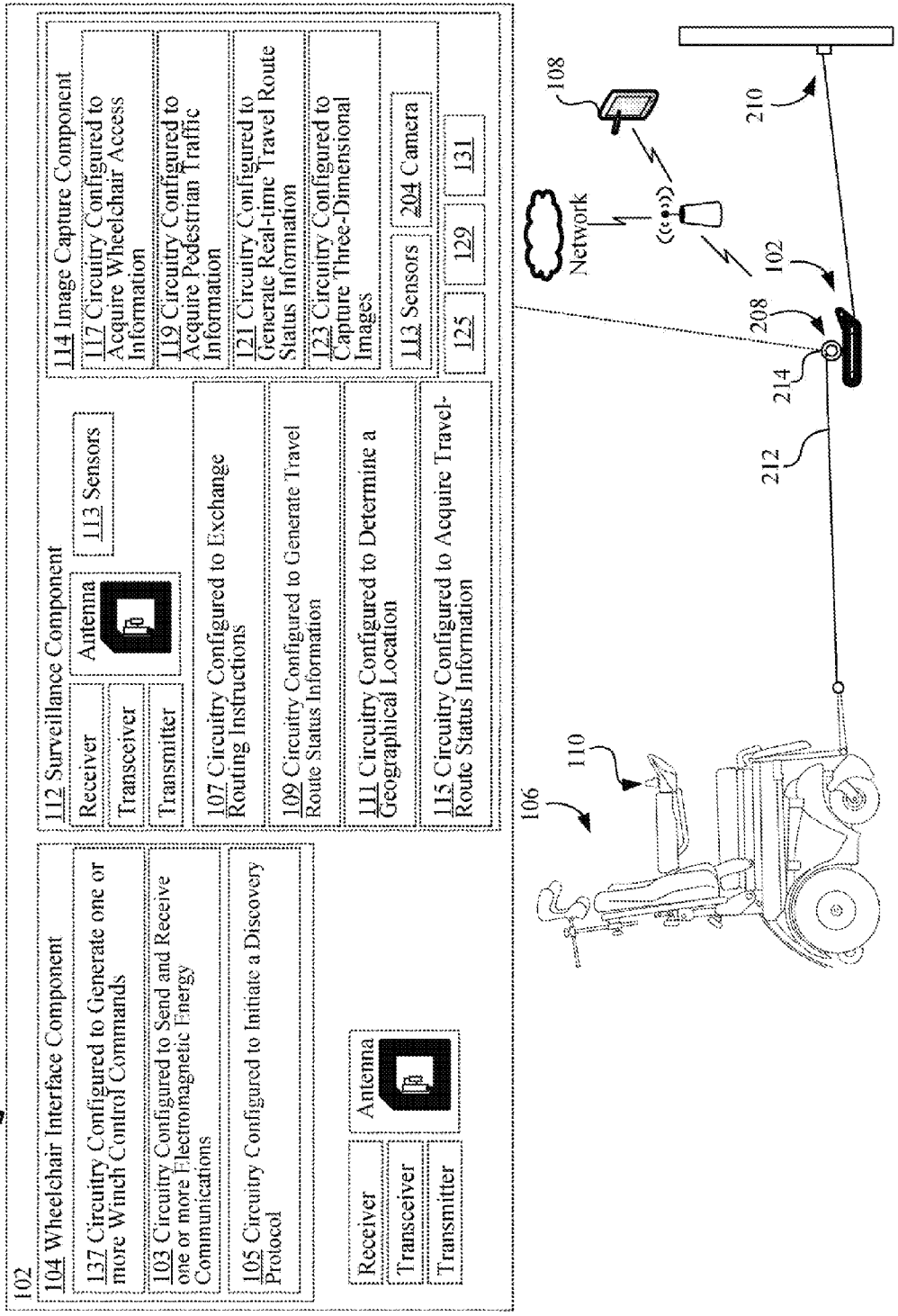
FIG. 3 is a perspective view of a wheelchair-assist robot system according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Assistive devices such as wheelchairs, wheelchair-assist robots, and the like may enhance mobility, accessibility, or independence for users, and may also improve quality of life. Assistive devices such as wheelchairs, wheelchair-assist robots, and the like may enable user to become mobile, remain healthy, participate fully in community life, as well as reduce dependence on others.

FIG. 1 shows a wheelchair-assist robot system 100 in which one or more methodologies or technologies can be implemented such as, for example, assisting an individual subject (e.g., a patient, a human subject, an animal subject, a user, a passenger, etc.) in a wheelchair (a manual wheel chair, a powered wheelchair, an electric wheelchair, a self-propelled wheelchair, etc.) with everyday tasks or activities. In an embodiment, the wheelchair-assist robot system 100 includes one or more wheelchair-assist robots 102. In an embodiment, the wheelchair-assist robot 102 assists a wheelchair user with everyday tasks or activities at work, at home, and the like.

In an embodiment, the wheelchair-assist robot 102 includes one or more components. For example, in an embodiment, the wheelchair-assist robot 102 includes a wheelchair interface component 104. In an embodiment, during operation, the wheelchair interface component 104 exchanges information, commands, status reports, sensor data, and the like with an associated wheelchair 106. In an embodiment, the wheelchair interface component 104 is configured to exchange control information with an associated wheelchair 106. For example, in an embodiment, the wheelchair interface component 104 includes at least one of a receiver, a transmitter, and a transceiver operable to exchange control information with an associated wheelchair 106. In an embodiment, the wheelchair interface component 104 includes at least one of a receiver, a transmitter, and a transceiver operable to communicate travel route status information with an associated wheelchair 106.

In an embodiment, a component such as a wheelchair interface component 104 includes, among other things, one or more computing devices such as a processor (e.g., a microprocessor), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, a component includes one or more ASICs having a plurality of predefined logic components. In an embodiment, a component includes one or more FPGAs, each having a plurality of programmable logic components.

In an embodiment, the wheelchair interface component 104 includes one or more components operably coupled (e.g., communicatively, electromagnetically, magnetically, ultrasonically, optically, inductively, electrically, capacitively coupled, or the like) to each other. In an embodiment, a component includes one or more remotely located components. In an embodiment, remotely located components are operably coupled, for example, via wireless communication. In an embodiment, remotely located components are operably coupled, for example, via one or more receivers, transmitters, transceivers, antennas, or the like. In an embodiment, the wheelchair interface component 104 includes a component having one or more routines, data structures, interfaces, and the like.

In an embodiment, a component includes memory that, for example, stores instructions or information. For example, in an embodiment, the wheelchair interface component 104 includes memory that stores, for example, information regarding travel routes, environmental conditions, hazards, wheelchair accessibility points, and the like. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like. In an embodiment, the memory is coupled to, for example, one or more computing devices by one or more instructions, information, or power buses.

In an embodiment, a component includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, a component includes one or more user input/output components, user interfaces, client devices, or the like, that are operably coupled to at least one computing device configured to control (e.g., electrical, electromechanical, software-implemented, firmware-implemented, or other control, or combinations thereof) at least one parameter associated with, for example, controlling activating, operating, or the like, a wheelchair-assist robot 102.

In an embodiment, a component includes a computer-readable media drive or memory slot that is configured to accept signal-bearing medium (e.g., computer-readable memory media, computer-readable recording media, or the like). In an embodiment, a program for causing a system to execute any of the disclosed methods can be stored on, for example, a computer-readable recording medium (CRMM), a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

In an embodiment, the wheelchair interface component 104 is configured to communicate with a client device 108 and to receive control commands from the client device 108. For example, in an embodiment, the wheelchair-assist robot 102 is controlled via one or more inputs from at least one client device 108 associated with a wheelchair 106. Non-limiting examples of client devices 108 include a wearable device, a smart device, a smart eyewear device, a smart wearable device, a computer device, a laptop computer device, a notebook computer device, a desktop computer device, a cell phone device, a tablet device, a managed node device, a remote controller, an application interface with a smart device, and the like. Further non-limiting examples of client devices 108 include wheelchair controllers 110, client devices 108 associated with a wheelchair 106, client devices 108 associated with a wheelchair-assist robot 102, and the like. Further non-limiting examples of client devices 108 include tongue drive control devices, sip-and-puff control devices, thought-based control devices, eye-tracking control devices, and the like. In an embodiment, the wheelchair-assist robot 102 is controlled via one or more inputs from a wheelchair controller 110. Further non-limiting examples of client devices 108 include input-output devices, user interfaces, graphical user interfaces, interaction devices, microphones, and the like.

In an embodiment, during operation the wheelchair interface component 104 is operable to find and establish a communication link with an associated wheelchair 106. For example, in an embodiment, the wheelchair interface component 104 includes circuitry 101 configured to detect an electromagnetic signal from a wheelchair controller 110 of an associated wheelchair 106. In an embodiment, the wheelchair interface component 104 includes one or more electromagnetic energy sensors that detect a wireless signal from a wheelchair controller 110. In an embodiment, the wheelchair interface component 104 includes circuitry 103 configured to send and receive one or more electromagnetic energy communications to and from a wheelchair controller 110. In an embodiment, the wheelchair interface component 104 is configured to detect a client device 108 associated with a remote wheelchair 106. In an embodiment, the wheelchair interface component 104 is configured to detect a client device 108 associated with a wheelchair controller 110.

In an embodiment, the wheelchair interface component 104 is configured to detect a beacon associated with a wheelchair controller 110. In an embodiment, the wheelchair interface component 104 includes circuitry 105 configured to initiate a discovery protocol that allows the wheelchair interface component and a wheelchair controller 110 to identify each other and to negotiate one or more pre-shared keys.

In an embodiment, during operation the wheelchair interface component 104 is operable to establish a communication link with a remote network device, a remote enterprise device, a cloud network device, a cloud server, and the like. For example, in an embodiment, the wheelchair interface component 104 includes at least one of a receiver, a transmitter, and a transceiver operable to establish a communication link with a remote enterprise device. In an embodiment, the wheelchair interface component 104 includes at least one of a receiver, a transmitter, and a transceiver operable to exchange routing or surveillance target instructions with a remote enterprise device. In an embodiment, the wheelchair interface component 104 includes at least one of a receiver, a transmitter, and a transceiver operable to communicate travel route status information with a client device 108 associated with a wheelchair 106. In an embodiment, the wheelchair-assist robot 102 is operable to receive routing or surveillance target instructions from an associated wheelchair 106.

In an embodiment, the wheelchair-assist robot 102 includes a surveillance component 112. In an embodiment the surveillance component 112 is operably coupled to one or more devices, components, sensors, and the like that acquire surveillance information to assist a user, an associated wheelchair 106, and the like acquire information regarding travel routes, environmental conditions, hazards, wheelchair accessibility, etc. In an embodiment, the surveillance component 112 is configured to exchange routing instructions with an associated wheelchair 106. For example, in an embodiment, the surveillance component 112 includes circuitry 107 configured to exchange routing instructions with an associated wheelchair 106. In an embodiment, the surveillance component 112 includes at least one of a receiver, a transmitter, and a transceiver operable to exchange routing instructions with an associated wheelchair 106. In an embodiment, the surveillance component 112 is configured to exchange surveillance target information with an associated wheelchair 106. In an embodiment, the surveillance component 112 is configured to exchange travel route status information with the wheelchair controller 110.

In an embodiment, the wheelchair-assist robot 102 includes a surveillance component 112 configured to generate travel route status information. For example, in an embodiment, the surveillance component 112 includes circuitry 109 configured to generate travel route status information based on one or more inputs from a wheelchair controller 110. In an embodiment, the surveillance component 112 includes circuitry 109 configured to generate travel route status information based on one or more inputs from a client device 108. In an embodiment, the travel-route status information to be generated includes one or more of travel-route traffic information, travel-route obstacle location information, travel-route map information, travel-route geographical location information, travel-route surface location information, travel-route images, and the like. In an embodiment, the surveillance component 112 includes circuitry 111 configured to determine a geographical location of the wheelchair-assist robot 102.

In an embodiment, the surveillance component 112 comprises one or more sensors 113. Non-limiting examples of sensors 113 include acoustic sensors, optical sensors, electromagnetic energy sensors, image sensors, photodiode arrays, charge-coupled devices (CCDs), complementary metal-oxide-semiconductor (CMOS) devices, transducers, optical recognition sensors, infrared sensors, radio frequency sensors, thermo sensor, and the like. Further not limiting examples of sensors 113 include accelerometers, inertial sensors, motion sensors, and the like. Further non-limiting examples of sensors 112 include directional sensors, geographical sensor, inertial navigation sensors, location sensor, object sensor, orientation sensors, tracking sensors, nodes, and the like In an embodiment, the surveillance component 112 comprises an image capture component 114. In an embodiment, the image capture component 114 is operably coupled to one or more sensors 113. For example, in an embodiment, the image capture component 114 is operably coupled to one or more image sensors and is operable to acquire image information. In an embodiment, the image capture component 114 comprises an infrared image capture component. In an embodiment, the image capture component 114 comprises a radar based object-detection device.

In an embodiment, the surveillance component 112 comprises an image capture component 114 that communicates captured image data with a remote network device. In an embodiment, the surveillance component 112 comprises an image capture component 114 that communicates captured image data with a wheelchair controller 110 for further processing and analysis. For example, in an embodiment, the surveillance component 112 comprises an image capture component 114 that communicates captured image data with a wheelchair controller 110 and receives control commands form the wheelchair controller 110 based on the captured image data.

In an embodiment, the surveillance component 112 includes circuitry 115 configured to acquire travel-route status information from a remote network device. In an embodiment, the surveillance component 112 includes circuitry 117 configured to acquire wheelchair access information from a remote network device. In an embodiment, the surveillance component 112 includes circuitry 119 configured to acquire pedestrian traffic information from a remote network device. In an embodiment, the surveillance component 112 includes circuitry 121 configured to generate real-time travel route status information responsive to an input indicated of a change to a travel-route status.

In an embodiment, the image capture component 114 includes circuitry 123 configured to capture three-dimensional images. For example, in an embodiment, the image capture component 114 includes a camera 204 configured to capture three-dimensional images (e.g., via stereoscopic combination of two or more 2-D images, via combination of range data with a 2-D image, etc.). In an embodiment, the image capture component 114 includes a pan tilt zoom (PTZ) camera. In an embodiment, the image capture component 114 comprises a camera 204 having an illumination component.

Referring to FIGS. 1 and 2, in an embodiment, a mobile wheelchair-assist robot 102 includes a plurality of rotatable members 116 operable to frictionally interface the mobile wheelchair-assist robot 102 to a travel surface and to move the mobile wheelchair-assist robot 102 along the travel surface. Non-limiting examples of rotatable members 116 include articulated tracks, continuous tracks, wheels, casters, ball rollers, drive wheels, steer wheels, propellers, or the like. In an embodiment, rotatable members 116 include one or more of motors, rotors, hubs, cranks, sprockets, brake assemblies, bearing assemblies, etc. In an embodiment, the mobile wheelchair-assist robot 102 includes one or more tracks. In an embodiment, the mobile wheelchair-assist robot 102 includes an articulated track assembly 120 including one or more continuous tracks 122 operable to move the mobile wheelchair-assist robot 102 along a travel path. In an embodiment, the mobile wheelchair-assist robot 102 includes an articulated track assembly 120 operable to move the mobile wheelchair-assist robot 102 along a travel path having stairs.

In an embodiment, the mobile wheelchair-assist robot 102 includes an autonomous imaged-guided climbing component 124 in communication with the articulated track assembly 120. In an embodiment, the autonomous imaged-guided climbing component 124 includes circuitry 126 configured to communicate one or more navigation control commands to vary one or more of propulsion, braking, or steering of the articulated track assembly 120 responsive to at least one input from one or more sensors 113.

In an embodiment, one or more rotatable members 116 include one or more brushless electric motors. In an embodiment, one or more of the rotatable members 116 are operably coupled to one or more actuators that use an electrical current or magnetic actuating force to vary the motion of a rotating component (e.g., an actuator that rotates an axle coupled to the wheel to give it steering, an actuator that activates a rotating component forming part of an electric brake system, a magnetic bearing, a magnetic torque device, a brushless electric motor, etc. to vary velocity, etc.). In an embodiment, the mobile wheelchair-assist robot 102 includes one or more wheels, each wheel having an electric wheel hub motor.

In an embodiment, the mobile wheelchair-assist robot 102 comprises a steering assembly 118 having one or more components, mechanisms, linkages, steering gear assemblies, or the like operable to steer the mobile wheelchair-assist robot 102. In an embodiment, the steering assembly 118 is operable to vary a steering angle, an orientation, a velocity, etc., of one or more rotatable members 116 responsive to one or more inputs from a surveillance component 112, a wheelchair interface component 104, a client device 108 associated with the wheelchair 106, and the like.

In an embodiment, the mobile wheelchair-assist robot 102 comprises a steering assembly 118 having one or more electro-mechanical elements operable to vary a steering angle, an orientation, a velocity, etc., of at least one rotatable member 116. In an embodiment, the steering assembly 118 is operable to vary a steering angle, an orientation, a velocity, etc., of one or more wheels. In an embodiment, the mobile wheelchair-assist robot 102 comprises a steering assembly 118 having one or more components linkages, steering gear assemblies, rod assemblies, or the like that aid in directing the mobile wheelchair-assist robot 102 along a target course. In an embodiment, the mobile wheelchair-assist robot 102 comprises steering assembly 118 having one or more actuators, electric wheel hub motors, magnetic bearings, magnetic torque devices, brushless electric motors, or the like that aid in directing the mobile wheelchair-assist robot 102 along a target course. In an embodiment, the mobile wheelchair-assist robot 102 comprises steering assembly 118 having one or more track assemblies that aid in directing the mobile wheelchair-assist robot 102 along a target course including stairs.

In an embodiment, the mobile wheelchair-assist robot 102 includes and image capture component 114 operable to locate an associated wheelchair 106. In an embodiment, the image capture component 114 is operably coupled to a power source and includes one or more components having circuitry configured to operate the power source and steering assembly 118 so as to maintain the mobile wheelchair-assist robot 102 at a target separation from an associated wheelchair 106. In an embodiment, the steering assembly 118 is communicatively coupled, physically coupled, electromagnetically coupled, magnetically coupled, ultrasonically coupled, optically coupled, inductively coupled, electrically coupled, capacitively coupled, wirelessly coupled, or the like) to the image capture component 114 and is configured to vary a mobile wheelchair-assist robot 102 heading based on one or more inputs from the image capture component 114 indicative of a change in position by the associated wheelchair 106. In an embodiment, the steering assembly 118 is communicatively coupled to the image capture component 114 and is configured to vary a mobile wheelchair-assist robot 102 heading based on a change in position by the associated wheelchair 106. In an embodiment, the steering assembly 118 is communicatively coupled to the image capture component 114 and is operable to control a direction of travel based on one or more inputs from the image capture component 114 indicative of a sensed change in position by the associated wheelchair 106. In an embodiment, the steering assembly 118 is operable to vary a steering angle, an orientation, a velocity, etc., of at least one rotatable member 110 based on a change in position by the associated wheelchair 106.

Non-limiting examples of wheelchairs 106 include manual wheelchairs, powered wheelchairs, electric wheelchairs, a self-propelled wheelchair, and the like. Further non-limiting examples of wheelchairs 106 include wheelchairs where the occupant normally powers and steers it with his hands via two large rear wheels. In an embodiment, large rear wheels allow the user of the wheelchair to self-propel, grasping the rear wheels, which have an extended rim, or handrim, that does not come in contact with the ground and thus allows the user to spin the rear wheels. This category would also include those wheelchairs that are designed to be pushed from behind by another person, either primarily or as an alternative/auxiliary propulsion implementations.

Referring to FIGS. 1 and 2, in an embodiment, the mobile wheelchair-assist robot 102 includes a surveillance component 112 having one or more object sensors. In an embodiment, the surveillance component 112 is configured to maintain the mobile wheelchair-assist robot 102 at a target separation from an associated wheelchair 106 based on one or more inputs form at least one object sensor. For an example, in an embodiment, during operation, the surveillance component 112 determines the location, trajectory, direction of travel, etc., of an associated wheelchair 106 based on one or more inputs from at least one object sensor. Once the location, trajectory, direction of travel, etc., is determined, the steering assembly 118 is operable to vary a steering angle, an orientation, a velocity, etc., of one or more rotatable members 116 so as to maintain the mobile wheelchair-assist robot 102 at a target separation from an associated wheelchair 106. In an embodiment, the surveillance component 112 is configured to maintain the mobile wheelchair-assist robot 102 at a target distance in front of the associated wheelchair 106 responsive to one or more inputs indicative of a wheelchair location. In an embodiment, the surveillance component 112 is configured to maintain the mobile wheelchair-assist robot 102 at a target distance behind the associated wheelchair 106. In an embodiment, the surveillance component 112 is configured to maintain the mobile wheelchair-assist robot 102 at a target distance from a side of the associated wheelchair 106.

In an embodiment, the surveillance component 112 is configured to survey a target region. For example, during operation, a user via the wheelchair interface component 104 can cause the surveillance component 112 to survey a target region of interest. In an embodiment, the surveillance component 112 is configured to generate one or more parameters associated with a target region responsive to one or more inputs from the wheelchair interface component 104. In an embodiment, the surveillance component 112 is configured to generate one or more parameters associated with the target region responsive to one or more inputs indicative of an associated wheelchair route. In an embodiment, the surveillance component 112 is configured to generate one or more parameters associated with the target region responsive to one or more inputs indicative of an associated wheelchair orientation. In an embodiment, the surveillance component 112 is configured to select the target region based on an associated wheelchair's orientation, position, or route; for instance to examine a region in front of the wheelchair, to the side of its route, etc.

In an embodiment, the surveillance component 112 includes one or more memories having wheelchair travel-route information stored thereon. In an embodiment, the surveillance component 112 comprises geographical information, navigation coordinate information, and the like stored on one or memories that is used to generate surveillance protocols including instructions for inspecting paths, roads, travel paths, etc., relative to a route or position of a wheelchair 106. In an embodiment, the surveillance component 112 is configured to navigate the mobile wheelchair-assist robot 102 along a wheelchair travel route responsive to one or more inputs indicative of an associated wheelchair position. In an embodiment, the surveillance component 112 includes circuitry 125 configured to provide travel route status information (e.g., obstacle information, wheelchair accessibility information, availability of assistive technology information, travel route traffic information, and the like) based on one or more captured images.

In an embodiment, the surveillance component 112 includes circuitry 127 configured to provide one or more of travel route image information, wheelchair geographic location information, or wheelchair travel direction information based on one or more captured images. In an embodiment, the surveillance component 112 circuitry configured to provide one or more of wheelchair travel velocity information, wheelchair propulsion information, or wheelchair braking information based on one or more captured images.

In an embodiment, the wheelchair interface component 104 includes circuitry 129 configured to generate one or more navigation control commands to vary one or more of propulsion, braking, or steering of an associated wheelchair 106 based on at least one input from the surveillance component 112. In an embodiment, the wheelchair interface component 104 is operably coupled one or more actuators, electric wheel hub motors, magnetic bearings, magnetic torque devices, brushless electric motors, or the like that aid in directing the an associated wheelchair 106 along a target course based on at least one input from the surveillance component 112. In an embodiment, the wheelchair interface component 104 includes circuitry 131 configured to communicate one or more navigation control commands to vary one or more of propulsion, braking, or steering of an associated wheelchair 106 based on at least one input from the surveillance component 112. In an embodiment, the mobile wheelchair-assist robot 102 includes a camera 204. In an embodiment, the mobile wheelchair-assist robot 102 includes a camera 204 that is operably coupled to the surveillance component 112.

In an embodiment, a wheelchair-assist robot 102 includes an articulated arm assembly 202. In an embodiment, the articulated arm assembly 202 is operable to exchange control information with a wheelchair client device 108. In an embodiment, the articulated arm assembly 202 is operably coupled to the wheelchair interface component 104. In an embodiment, the articulated arm assembly 202 is configured for multi-axis articulation and rotation. In an embodiment, the articulated arm assembly 202 is configured to move between at least a first position and a second position. In an embodiment, the articulated arm assembly 202 is configured to move between a first position and a second position responsive to one or more inputs from a client device 108 associated with a wheelchair 106. In an embodiment, the articulated arm assembly 202 is configured to move between one or more positions responsive to one or more inputs from an associated wheelchair 106. In an embodiment, the articulated arm assembly 202 is configured to move at least between a first position and a second position responsive to one or more inputs from an associated wheelchair 106. In an embodiment, the articulated arm assembly 202 is configured to move between a first position and a second position responsive to one or more inputs form the wheelchair interface component 104.

In an embodiment, the articulated arm assembly 202 comprises a grasping mechanism 220 configured to move a first grasping member 222 relative to a second grasping member 224 between at least a first position and a second position. In an embodiment, the grasping mechanism 220 is configured to move the first grasping member 222 relative to the second grasping member 224 between an open position and a closed position.

In an embodiment, the wheelchair interface component 104 is configured to vary the position of the grasping mechanism 220 based on one or more inputs a wheelchair client device 108. In an embodiment, the grasping mechanism 220 is configured to move the first grasping member 222 relative to the second grasping member 224 between an open position and a closed position responsive to one or more inputs from a client device 108 associated with a wheelchair 106. In an embodiment, the grasping mechanism 220 is configured to move the first grasping member 222 relative to the second grasping member 224 between an open position and a closed position responsive to one or more inputs from an associated wheelchair 106. In an embodiment, the grasping mechanism 220 is configured to articulate between a first position and at least a second position responsive to one or more inputs form the wheelchair interface component 104.

In an embodiment, the grasping mechanism 220 is configured to grasp a power plug of an associated wheelchair power supply and insert the power plug into an electrical outlet. In an embodiment, the wheelchair-assist robot 102 includes a spare power supply for an associated wheelchair 106. In an embodiment, the grasping mechanism 220 is configured to grasp a power plug associated with the spare power supply and insert the power plug into an electrical outlet. In an embodiment, the grasping mechanism 220 is configured to grasp a doorknob or door lever in order to open or close a door.

In another embodiment, the articulated arm assembly 202 comprises a digit member configured to move between at least a first position and a second position. In an embodiment, the digit member is fixedly attached to articulated arm assembly 202 and moves due to motion of articulated arm assembly 202. In another embodiment, the digit member is configured to move relative to articulated arm assembly 202. In one embodiment, motion of the digit member can be used to push a button in order to perform tasks such as ringing a doorbell, summoning an elevator, etc. In an embodiment, the digit member is configured to move between a first position and a second position responsive to one or more inputs from a client device 108 associated with a wheelchair 106. In an embodiment, the digit member is configured to move between a first position and a second position responsive to one or more inputs from an associated wheelchair 106. In an embodiment, the digit member is configured to move between a first position and a second position responsive to one or more inputs form the wheelchair interface component 104.

In an embodiment, the wheelchair-assist robot 102 includes an autonomous imaged-guided engage component 133. In an embodiment, the autonomous imaged-guided engage component 133 is operable to generate one or more commands that vary the position of the grasping mechanism 220, the articulated arm assembly 202, or the digit member based on one or more inputs from an imaging sensor. In an embodiment, the articulated arm assembly 202 comprises one or more imaging sensor. In an embodiment, the articulated arm assembly 202 comprises one or more imaging sensor proximate the grasping mechanism 220.

In an embodiment, a camera 204 is mounted on a distal end of an articulated arm assembly 202. In an embodiment, the camera 204 is operably coupled to the surveillance component 112. In an embodiment, the articulated arm assembly 202 changes a vertical or horizontal position of the camera 204 responsive to one or more inputs from the wheelchair interface component 104. In an embodiment, the camera 204 includes circuitry for capturing three-dimensional images. In an embodiment, the camera 204 comprises a pan tilt zoom (PTZ) camera. In an embodiment, the camera 204 comprises an illumination component.

In an embodiment, the wheelchair-assist robot 102 includes an autonomous navigation component 135. For example, in an embodiment, the wheelchair-assist robot 102 includes an automated imaged-based obstacle avoidance component 206 configured to generate one or more navigation control commands to vary one or more of propulsion, braking, or steering of the mobile wheelchair-assist robot based on at least one input from the surveillance component 112.

Referring to FIGS. 2 and 3, in an embodiment, the wheelchair-assist robot 102 includes a powered winch assembly 208 mounted on a frame. In an embodiment, the winch assembly 208 is operably coupled to the wheelchair interface component 104. In an embodiment, the winch assembly 208 is configured to deploy responsive to one or more inputs from a client device 108. In an embodiment, the winch assembly 208 is configured to deploy responsive to one or more inputs from the wheelchair interface component 104.

In an embodiment, the wheelchair-assist robot 102 includes an anchor assembly 210. In an embodiment, during operation the wheelchair-assist robot 102 can anchor itself to the ground or a structure along a travel path when pulling a wheelchair 106. In an embodiment, the anchor assembly 210 include one or more of a hook, a cable, a pull member, an attachment member, an anchor, and the like.

In an embodiment, the powered winch assembly 208 includes a pull member 212 configured to connect to a wheelchair 106 and to pull the wheelchair 106 along a travel path responsive to one or more inputs from the wheelchair interface component 104. In an embodiment, the pull member 212 comprises a cable, a wire, or a rope. In an embodiment, the powered winch assembly 208 includes a pull member 212 configured to connect to a wheelchair 106 and to pull the wheelchair 106 along a travel path responsive to one or more inputs from a client device 108.

In an embodiment, the powered winch assembly 208 includes a winch drum 214 operably coupled to a drive mechanism that winds a pull member 212 around the winch drum 214. In an embodiment, the wheelchair interface component 104 includes circuitry 137 configured to generate one or more winch control commands to vary a winch drum 214 turn rate responsive to one or more inputs from the wheelchair interface component 104.

In an embodiment, the wheelchair interface component 104 includes circuitry 137 configured to generate one or more winch control commands to vary a torque based on at least one input from the wheelchair interface component 104. In an embodiment, the wheelchair interface component 104 includes circuitry 103 configured to send and receive one or more electromagnetic energy communications to and from a wheelchair controller 110. In an embodiment, the wheelchair interface component 104 includes at least one of a receiver, a transmitter, and a transceiver operable to communicate with a wheelchair controller 110.

FIGS. 4A and 4B show a wheelchair-assist robot system 100 in which one or more methodologies or technologies can be implemented such as, for example, assisting an individual subject (e.g., a patient, a human subject, an animal subject, a user, a passenger, etc.) in a wheelchair with everyday tasks. In an embodiment, the wheelchair-assist robot system 100 includes one or more flying wheelchair-assist robots 402. In an embodiment, the flying wheelchair-assist robot 402 assists a wheelchair user with everyday tasks at work, at home, and the like.

In an embodiment, the flying wheelchair-assist robot 402 is operably coupled to a wheelchair interface component 104. In an embodiment, the flying wheelchair-assist robot 402 includes a rotorcraft structure 404. In an embodiment, the rotorcraft structure 404 includes one or more rotors 406 for generating lift. In an embodiment, the rotorcraft structure 404 includes multiple rotors 406 driven by respective motors 408. In an embodiment, the rotorcraft structure 404 includes a plurality of rotary wings 410. In an embodiment, the rotorcraft structure 404 comprises a multirotor helicopter.

In an embodiment, the flying wheelchair-assist robot 402 includes an electronic surveillance payload 412. In an embodiment, the electronic surveillance payload 412 includes one or more image sensors. In an embodiment, the electronic surveillance payload 412 includes one or more acoustic sensors. In an embodiment, the electronic surveillance payload 412 includes one or more electromagnetic energy sensors. In an embodiment, the electronic surveillance payload 412 includes at least one of a receiver, a transmitter, and a transceiver. In an embodiment, the electronic surveillance payload 412 includes one or more components configured to provide travel route status information based on one or more captured images.

In an embodiment, the flying wheelchair-assist robot 402 includes a wheelchair interface component 104 operable to exchange control information with a wheelchair client device 108. In an embodiment, the wheelchair interface component 104 includes circuitry 129 configured to generate one or more navigation control commands to vary one or more of propulsion, braking, or steering of an associated wheelchair 106 based on at least one input from a component associated with the electronic surveillance payload 412.

In an embodiment, the flying wheelchair-assist robot 402 includes a fastening structure 414 for removably attaching the flying wheelchair-assist robot to a wheelchair 106. In an embodiment, the flying wheelchair-assist robot 402 includes a fastening structure 414 having a power interface, the fastening structure 414 dimensioned and configured to removably attach the flying wheelchair-assist robot 402 to a wheelchair 106, and to electrically couple the flying wheelchair-assist robot 402 to a wheelchair power supply.

In an embodiment, the flying wheelchair-assist robot 402 includes an image capture component 114. In an embodiment, the image capture component 114 comprises an infrared image capture component. In an embodiment, the image capture component 114 comprises a radar based object-detection device. In an embodiment, the image capture component 114 includes one or more object sensors and is configured to maintain the flying wheelchair-assist robot 402 at a target separation from an associated wheelchair 106. In an embodiment, the image capture component 114 is configured to maintain the flying wheelchair-assist robot 402 at a target distance above the associated wheelchair 106. In an embodiment, the image capture component 114 is configured to maintain the flying wheelchair-assist robot 402 at a target distance in front of the associated wheelchair 106. In an embodiment, the image capture component 114 is configured to maintain the flying wheelchair-assist robot 402 at a target distance behind the associated wheelchair 106. In an embodiment, the image capture component 114 is configured to maintain the flying wheelchair-assist robot 402 at a target distance from a side of the associated wheelchair 106.

In an embodiment, the image capture component 114 is configured to survey a target region (e.g., surveillance region, a target surveillance region, a travel route region, and the like.) For example, during operation, a user via the wheelchair interface component 104, can cause the image capture component 114 to survey a target region of interest. In an embodiment, the image capture component 114 is configured to generate one or more parameters associated with a target region responsive to one or more inputs from the wheelchair interface component 104. In an embodiment, the image capture component 114 is configured to generate one or more parameters associated with the target region responsive to one or more inputs indicative of an associated wheelchair route. In an embodiment, the image capture component 114 is configured to generate one or more parameters associated with the target region responsive to one or more inputs indicative of an associated wheelchair orientation. In an embodiment, the image capture component 114 is configured to select the target region based on an associated wheelchair's orientation, position, or route; for instance to examine a region behind the wheelchair, in front of its route, etc.

In an embodiment, the flying wheelchair-assist robot 402 includes circuitry 123 for capturing three-dimensional images. In an embodiment, the flying wheelchair-assist robot 402 includes a pan tilt zoom (PTZ) camera. In an embodiment, the flying wheelchair-assist robot 402 includes an illumination component. In an embodiment, the flying wheelchair-assist robot 402 includes an autonomous navigation component that generates one or more navigation control commands responsive to at least one input form the image capture component 114. Referring to FIG. 4B, in an embodiment, the flying wheelchair-assist robot 402 includes a transfer arm assembly 416 connected to a payload-support structure 418. In an embodiment, the transfer arm assembly 416 is configured for autonomous transfer of a payload to and from the payload-support structure 418.

Referring to FIG. 4A, in an embodiment, the flying wheelchair-assist robot 402 includes circuitry 139 for providing an audio signal indicative of a presence, arrival, or imminent arrival of an associated wheelchair 106. For example, in an embodiment, the flying wheelchair-assist robot 402 includes one or more speakers. In an embodiment, the flying wheelchair-assist robot 402 includes one or more memories having wheelchair travel-route information stored thereon. In an embodiment, the flying wheelchair-assist robot 402 includes one or more memories having geographical information associated with a wheelchair travel route stored thereon.

Referring to FIG. 4B, in an embodiment, a fastening structure 414 includes a drive assembly 420 including a drive motor operatively connected to a client device 108. In an embodiment, the fastening structure 414 is operable to transition between a wheelchair-assist robot deploy configuration 422 and a wheelchair-assist robot secure configuration 424 when the drive assembly 420. For example, in an embodiment, the fastening structure 414 is operable to transition between a wheelchair-assist robot deploy configuration 422 and a wheelchair-assist robot secure configuration 424 when the drive assembly 420 is activated by one or more inputs from a client device 108 or an associated wheelchair 106. In an embodiment, the fastening structure 414 includes a power interface. In an embodiment, the fastening structure 414 is dimensioned and configured to removably attach the flying wheelchair-assist robot 402 to a wheelchair 106, and to electrically couple the flying wheelchair-assist robot 402 to a wheelchair power supply.

FIG. 5 shows a wheelchair-assist robot system 100 in which one or more methodologies or technologies can be implemented such as, for example, assisting an individual subject (e.g., a patient, a human subject, an animal subject, a user, a passenger, etc.) in a wheelchair with everyday tasks. In an embodiment, the wheelchair-assist robot system 100 includes one or more wheelchair-assist robots 102. In an embodiment, wheelchair-assist robot system 100 includes at least one wheelchair-assist robot mount assembly 502 constructed and arranged to be mounted onto a wheelchair 106.

In an embodiment, the wheelchair-assist robot mount assembly 502 comprises a portion 504 that engages a mobile wheelchair-assist robot 102 and causes the mobile wheelchair-assist robot 102 to physically secure against a portion of the wheelchair 106. In an embodiment, the wheelchair-assist robot mount assembly 502 includes a portion 504 that engages the mobile wheelchair-assist robot 102 and causes the mobile wheelchair-assist robot 102 to physically secure against a portion of the wheelchair 106 in response to movement of the wheelchair-assist robot mount assembly 502.

In an embodiment, the wheelchair-assist robot mount assembly 502 includes a powered device mechanism 506 that engages the mobile wheelchair-assist robot 102 and causes the mobile wheelchair-assist robot 102 to physically secure against a portion of the wheelchair 106 in response to one or more inputs from a client device 108 associated with a wheelchair. In an embodiment, the wheelchair-assist robot mount assembly 502 includes a power interface component operable to electrically couple the mobile wheelchair-assist robot 102 to a wheelchair power supply.

In an embodiment, the wheelchair-assist robot mount assembly 502 includes a wheelchair interface component 104 that allows a wheelchair controller and the wheelchair-assist robot 102 to exchange control commands. In an embodiment, the wheelchair-assist robot mount assembly 502 includes a wheelchair interface component 104 that allows a client device 108 associated with a wheelchair 106 and the wheelchair-assist robot 102 to exchange control commands.

In an embodiment, the wheelchair-assist robot mount assembly 502 comprises a chassis 508 constructed and arranged to support the wheelchair-assist robot 102.

In an embodiment, the wheelchair-assist robot mount assembly 502 comprises a mounting frame 510 secured to the chassis 508. In an embodiment, the mounting frame 510 is constructed and arranged to physically secure against a portion of the wheelchair 106.

In an embodiment, the wheelchair-assist robot mount assembly 502 includes a drive assembly 512 including a drive motor operatively connected to a client device 108. In an embodiment, the wheelchair-assist robot mount assembly 502 is operable to transition between a wheelchair-assist robot deploy configuration 514 and a wheelchair-assist robot secure configuration 516 when the drive assembly 512 is activated by one or more inputs from the client device 108.

In an embodiment, the wheelchair-assist robot mount assembly 502 includes a wheelchair-assist robot interface 518 configured to exchange control information with the wheelchair-assist robot 102. In an embodiment, the wheelchair-assist robot mount assembly 502 includes a wheelchair-assist robot dock interface 520 configured to communicably couple the wheelchair-assist robot 102 to an associated wheelchair 106. In an embodiment, the wheelchair-assist robot mount assembly 502 includes a wheelchair-assist robot dock interface 520 configured to electrically couple the wheelchair-assist robot 102 to a power supply of an associated wheelchair 106. In an embodiment, wheelchair-assist robot system 100 includes a coupling component 522 mounted to the wheelchair-assist robot mount assembly 502 for physically coupling of the wheelchair-assist robot 102 to a wheelchair.

In an embodiment, wheelchair-assist robot system 100 includes an autonomous imaged-guided docking component 524 operably coupled to the wheelchair-assist robot 102. In an embodiment, the autonomous imaged-guided docking component 524 includes circuitry configured to communicate one or more navigation control commands to vary one or more of propulsion, braking, or steering of the wheelchair-assist robot 102 responsive to one or more inputs indicative of wheelchair-assist robot position relative to the wheelchair-assist robot mount assembly 502. In an embodiment, the wheelchair-assist robot mount assembly 502 includes one or more sensors operably coupled to the wheelchair-assist robot 102, the one or more sensors configured to generate control information to guide the wheelchair-assist robot system onto the wheelchair-assist robot mount assembly 502.

In an embodiment, the wheelchair-assist robot mount assembly 502 includes an inductive power component 526. In an embodiment, the wheelchair-assist robot mount assembly 502 includes an inertial reference component.

In an embodiment, the wheelchair-assist robot mount assembly 502 includes one or more guide structure elements 528 dimensioned and configured to align the wheelchair-assist robot system onto the wheelchair-assist robot mount assembly 502. In an embodiment, the wheelchair-assist robot mount assembly 502 includes one or more friction-fit members dimensioned and configured to secure the wheelchair-assist robot system to the wheelchair-assist robot mount assembly 502. In an embodiment, the wheelchair-assist robot mount assembly 502 includes one or more locking members dimensioned and configured to secure the wheelchair-assist robot system to the wheelchair-assist robot mount assembly 502. In an embodiment, the wheelchair-assist robot mount assembly 502 includes one or more clamping members dimensioned and configured to secure the wheelchair-assist robot system to the wheelchair-assist robot mount assembly 502.

In an embodiment, the wheelchair-assist robot 102 is operably coupled to a client device 108 of an associated wheelchair 106. In an embodiment, the wheelchair-assist robot 102 includes circuitry configured to receive travel route status information from the client device 108 of an associated wheelchair 106. In an embodiment, the wheelchair-assist robot includes circuitry configured to receive travel route status information from the client device 108 of an associated wheelchair (e.g., obstacle information, wheelchair accessibility information, availability of assistive technology information, travel route traffic information, and the like) based on one or more transmitted images.

In an embodiment, the wheelchair-assist robot 102 includes an image capture component 114. In an embodiment, the image capture component 114 is configured to communicate image information with a client device 108 of an associated wheelchair 106. In an embodiment, the image capture component 114 is configured to communicate infrared image information with a client device 108 of an associated wheelchair 106. In an embodiment, the image capture component 114 is configured to communicate infrared image information with a client device 108 of an associated wheelchair 106. In an embodiment, the image capture component 114 comprises a radar based object-detection device.

In an embodiment, the image capture component 114 includes one or more object sensors and is configured to maintain the mobile wheelchair-assist robot at a target separation from an associated wheelchair 106. In an embodiment, the image capture component 114 is configured to maintain the mobile wheelchair-assist robot at a target distance above the associated wheelchair 106. In an embodiment, the image capture component 114 is configured to maintain the mobile wheelchair-assist robot at a target distance in front of the associated wheelchair 106. In an embodiment, the image capture component 114 is configured to maintain the mobile wheelchair-assist robot at a target distance behind the associated wheelchair 106. In an embodiment, the image capture component 114 is configured to maintain the mobile wheelchair-assist robot at a target distance from a side of the associated wheelchair 106.

In an embodiment, the image capture component 114 is configured to survey a target region. In an embodiment, the image capture component 114 is configured to generate one or more parameters associated with the target region responsive to one or more inputs from the wheelchair interface component 104. In an embodiment, the image capture component 114 is configured to generate one or more parameters associated with the target region responsive to one or more inputs indicative of an associated wheelchair route. In an embodiment, the image capture component 114 is configured to select the target region based on the associated wheelchair's orientation, position, or route; for instance to examine a region to the side of the wheelchair, down a cross street, etc.

In an embodiment, the wheelchair-assist robot 102 is configured to dock underneath a wheelchair 106. For example, in an embodiment, during operation, a wheelchair-assist robot 102 assisting a manual wheelchair, would dock underneath the wheelchair, elevate the wheelchair slightly such that the wheelchair's drive wheels (or all of its wheels) no longer contact the ground) and then propel and steer the wheelchair as described in this application. In an embodiment, wheelchair's wheels remain in contact with the ground to some degree in order to provide stability and more precise steering.

The claims, description, and drawings of this application may describe one or more of the instant technologies in operational/functional language, for example as a set of operations to be performed by a computer. Such operational/functional description in most instances can be specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other implementations. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, java, visual basic), etc.), or tools in the form of Very high speed Hardware Description Language ("VIDAL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchanging/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, available at the website en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, available at the website en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer—programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, available at the website en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, available at the website en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, available at the website en.wikipedia.org/wiki/Insturctions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, it can be recognizes that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

At least a portion of the devices or processes described herein can be integrated into an information processing system. An information processing system generally includes one or more of a system unit housing, a video display device, memory, such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving or adjusting components or quantities). An information processing system can be implemented utilizing suitable commercially available components, such as those typically found in data computing/communication or network computing/communication systems.

The state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc. in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably coupleable," to each other to achieve the desired functionality. Specific examples of operably coupleable include, but are not limited to, physically mateable, physically interacting components, wirelessly interactable, wirelessly interacting components, logically interacting, logically interactable components, etc.

In an embodiment, one or more components may be referred to herein as "configured to," "configurable to," "operable/operative to," "adapted/adaptable," "able to," "conformable/conformed to," etc. Such terms (e.g., "configured to")

can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings includes overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A mobile wheelchair-assist robot system, comprising:
   a wheelchair-assist robot;
   a wheelchair-assist robot mount assembly constructed and arranged to be mounted onto a wheelchair, the wheelchair-assist robot mount assembly having a powered device mechanism that engages the mobile wheelchair-assist robot and causes the mobile wheelchair-assist robot to physically secure against a portion of a wheelchair in response to one or more inputs from a client device associated with the wheelchair, the wheelchair-assist robot mount assembly including a wheelchair-assist robot interface configured to communicably couple movements of the wheelchair-assist robot to the wheelchair from a first position remote and uncoupled from the wheelchair to a second position secured against and coupled to the wheelchair; and an autonomous imaged-guided docking component operably coupled to the wheelchair-assist robot, the autonomous imaged-guided docking component having circuitry configured to communicate one or more navigation control commands to vary one or more of propulsion, braking, or steering of the wheelchair-assist robot responsive to one or more inputs indicative of wheelchair-assist robot position relative to the wheelchair-assist robot mount assembly to move the wheelchair-assist robot between the first position and the second position.

2. The mobile wheelchair-assist robot system of claim 1, wherein the wheelchair-assist robot mount assembly includes a power interface component operable to electrically couple the mobile wheelchair-assist robot to a wheelchair power supply.

3. The mobile wheelchair-assist robot system of claim 1, wherein the wheelchair-assist robot mount assembly includes a wheelchair interface component that allows the client device associated with the wheelchair and the wheelchair-assist robot to exchange control commands.

4. The mobile wheelchair-assist robot system of claim 1, wherein the wheelchair-assist robot mount assembly comprises a chassis constructed and arranged to support the wheelchair-assist robot.

5. The mobile wheelchair-assist robot system of claim 1, wherein the wheelchair-assist robot mount assembly comprises:
a drive assembly including a drive motor operatively connected to the client device, the wheelchair-assist robot mount assembly operable to transition between a wheelchair-assist robot deploy configuration and a wheelchair-assist robot secure configuration when the drive assembly is activated by one or more inputs from the client device.

6. The mobile wheelchair-assist robot system of claim 1, wherein the wheelchair-assist robot mount assembly comprises:
a wheelchair-assist robot interface configured to exchange control information with the wheelchair-assist robot.

7. The mobile wheelchair-assist robot system of claim 1, wherein the wheelchair-assist robot mount assembly comprises:
a wheelchair-assist robot dock interface configured to communicably couple the wheelchair-assist robot to an associated wheelchair.

8. The mobile wheelchair-assist robot system of claim 1, wherein the wheelchair-assist robot mount assembly comprises:
a wheelchair-assist robot dock interface configured to electrically couple the wheelchair-assist robot to a power supply of an associated wheelchair.

9. The mobile wheelchair-assist robot system of claim 1, further comprising:
a coupling component mounted to the wheelchair-assist robot mount assembly for physically coupling of the wheelchair-assist robot to a wheelchair.

10. The mobile wheelchair-assist robot system of claim 1, wherein the wheelchair-assist robot mount assembly includes one or more sensors operably coupled to the wheelchair-assist robot, the one or more sensors configured to generate control information to guide the wheelchair-assist robot system onto the wheelchair-assist robot mount assembly.

11. The mobile wheelchair-assist robot system of claim 1, wherein the wheelchair-assist robot mount assembly includes an inductive power component.

12. The mobile wheelchair-assist robot system of claim 1, wherein the wheelchair-assist robot mount assembly includes an inertial reference component.

13. The mobile wheelchair-assist robot system of claim 1, wherein the wheelchair-assist robot mount assembly includes one or more friction-fit members dimensioned and configured to secure the wheelchair-assist robot system to the wheelchair-assist robot mount assembly.

14. The mobile wheelchair-assist robot system of claim 1, wherein the wheelchair-assist robot mount assembly includes one or more clamping members dimensioned and configured to secure the wheelchair-assist robot system to the wheelchair-assist robot mount assembly.

15. The mobile wheelchair-assist robot system of claim 1, wherein the wheelchair-assist robot is operably coupled to the client device associated with the wheelchair.

16. The mobile wheelchair-assist robot system of claim 1, wherein the wheelchair-assist robot includes an image capture component.

17. The mobile wheelchair-assist robot system of claim 16, wherein the image capture component is configured to communicate image information with the client device associated with the wheelchair.

18. The mobile wheelchair-assist robot system of claim 16, wherein the image capture component is configured to communicate infrared image information with the client device associated with the wheelchair.

19. The mobile wheelchair-assist robot system of claim 16, wherein the image capture component comprises a radar based object-detection device.

20. The mobile wheelchair-assist robot system of claim 16, wherein the image capture component includes one or more object sensors and is configured to maintain the mobile wheelchair-assist robot at a target separation from the associated wheelchair.

21. The mobile wheelchair-assist robot system of claim 16, wherein the image capture component is configured to survey a target region.

22. The mobile wheelchair-assist robot system of claim 21, wherein the image capture component is configured to generate one or more parameters associated with the target region responsive to one or more inputs from the wheelchair interface component.

23. The mobile wheelchair-assist robot system of claim 21, wherein the image capture component is configured to generate one or more parameters associated with the target region responsive to one or more inputs indicative of an associated wheelchair route.

24. The mobile wheelchair-assist robot of claim 21, wherein the image capture component is configured to select the target region based on at least one of the associated wheelchair's orientation, the associated wheelchair's position, and the associated wheelchair's route.

* * * * *